United States Patent [19]

Ohta et al.

[11] Patent Number: 4,602,702
[45] Date of Patent: Jul. 29, 1986

[54] BRAKE APPARATUS

[75] Inventors: Ryuji Ohta, Kamifukuoka; Michio Kobayashi, Hiki, both of Japan

[73] Assignee: Jidosha Kiki Co., Ltd., Tokyo, Japan

[21] Appl. No.: 683,290

[22] Filed: Dec. 18, 1984

[30] Foreign Application Priority Data

Dec. 28, 1983 [JP]  Japan .................... 58-245537
Dec. 28, 1983 [JP]  Japan .................... 58-245538
Dec. 29, 1983 [JP]  Japan .................... 58-252075

[51] Int. Cl.⁴ .................. F16D 55/02; F16D 65/18
[52] U.S. Cl. ................... 188/72.1; 188/72.4; 188/71.7; 188/106 P; 188/158; 303/3; 303/20
[58] Field of Search ............ 303/3, 15, 95, 97, 20; 188/181 C, 181 R, 155, 156, 157, 158, 159, 160, 161, 162, 163, 164, 72.1, 72.4, 72.5, 72.6, 72.9, 106 A, 106 P, 71.7, 71.8; 310/328; 192/84 R

[56] References Cited

U.S. PATENT DOCUMENTS

| 1,968,583 | 7/1934 | Apple | 188/164 |
| 3,390,559 | 7/1968 | Steutzer | 310/328 |
| 3,551,764 | 12/1970 | Evans | 310/328 |
| 3,684,904 | 8/1972 | Galutra et al. | 310/328 |
| 3,690,417 | 9/1972 | Airheart | 188/71.8 |
| 3,790,225 | 2/1974 | Wehde | 188/162 |
| 3,902,085 | 8/1975 | Bizzigotti | 310/328 |
| 4,327,414 | 4/1982 | Klein | 188/181 C |
| 4,471,256 | 9/1984 | Igashira et al. | 310/328 |

FOREIGN PATENT DOCUMENTS

| 1066345 | 11/1979 | Canada | 310/328 |
| 0031532 | 3/1981 | Japan . | |
| 0501585 | 9/1983 | Japan . | |
| 2080458 | 2/1982 | United Kingdom | 303/3 |

OTHER PUBLICATIONS

"Small Size Piezoelectric Ceramic Actuator" by S. Takahashi et al., May 17, 1983, Sub-Institutes of Super Sonic and Electronic Parts and Material, IECE.

Primary Examiner—Bruce H. Stoner, Jr.
Assistant Examiner—Alvin Oberley
Attorney, Agent, or Firm—Townsend & Townsend

[57] ABSTRACT

A brake apparatus has an actuator mechanism for bringing a friction member into tight contact with a braking member to generate a braking force, the actuator mechanism comprising:
a main actuating unit for moving the friction member to a position where the friction member is in contact with the braking member;
a subactuating unit for further urging the friction member which is in contact with the braking member so as to generate the braking force, the subactuating unit being constituted by a piezoceramic element; and
a controller for operating the main actuating unit first and then the subactuating unit in accordance with a brake command from a first sensor.

17 Claims, 7 Drawing Figures

BRAKE APPARATUS

BACKGROUND OF THE INVENTION

The present invention relates to a brake apparatus having an actuator mechanism wherein friction members are brought into tight contact with a braking member.

Brake apparatuses for controlling a vehicle speed or stopping a vehicle are generally classified into drum and disc brakes. A disc brake produces a braking force by bringing friction pads into tight contact with a disc so as to clamp the disc. With a disc brake, a stable and uniform distribution of the braking force can be obtained. In addition, the disc brake has a high heat resistance, an automatic braking force adjustment mechanism can be easily mounted on the disc brake apparatus, and braking noise is minimal. A drum brake apparatus does not have these advantages. For this reason, the disc brake apparatus has prevailed.

In conventional brake apparatuses, a hydraulic cylinder system as a power transmitting means is adapted as an input actuator mechanism to transmit a hydraulic (or pneumatic) pressure. The friction pads are brought into tight contact with or are separated from the disc in accordance with the depression/release of a brake pedal. In the hydraulic actuator mechanism, a braking force obtained only upon depression of the brake pedal is limited, so a force amplifying device consisting of a master cylinder, a servo unit and so on is adapted to increase the clamping force of the friction pads with respect to the disc.

However, any conventional brake apparatus using the hydraulic actuator mechanism described above requires a master cylinder, a booster, a wheel cylinder and brake fluid piping, resulting in a complicated construction and cumbersome molding and assembly. This leads to not only high cost but also requires extra mounting space. As a safety measure, a plurality of independent brake systems are often arranged in parallel with each other. In this case, the above drawbacks become decisive.

Demand has recently arisen for brake control including a variety of applications such as an anti-skid mechanism. Conventional hydraulic brake apparatuses cannot satisfy this demand.

In order to overcome the conventional drawbacks, an actuator mechanism in the brake apparatus comprises an electric motor or a slurry clutch, as described in Japanese Patent Disclosure No. 56-31532. An electromagnetic brake is used in an actuator mechanism, as described in International Application No. PCT/DE82/00172 (International Disclosure No. WO83/01044). Unlike other conventional actuator mechanisms which are mechanically operated, these actuator mechanisms are electrically operated, so that a proper braking force can be quickly produced in a flexible manner.

According to the conventional brake apparatus using the electrical actuator mechanism of the type described above, wiring from the brake pedal can be simplified, but the actuator body opposing the disc is large. The construction of the actuator mechanism is complicated, resulting in high cost and high power consumption. In addition, precise braking force control cannot be properly performed. As a result, there is much room for improvement in this conventional brake apparatus.

SUMMARY OF THE INVENTION

It is, therefore, a principal object of the present invention to obtain a proper and accurate braking force with a simple and low-cost construction.

It is another object to provide a compact and lightweight brake apparatus for simply and properly performing a variety of complicated applications of braking control.

In order to achieve the above objects of the present invention, there is provided a brake apparatus comprising an actuator mechanism for bringing a friction member into tight contact with a braking member to generate a braking force, the actuator mechanism comprising:

a main actuating unit for moving the friction member to a position where the friction member is in contact with the braking member;

a subactuating unit for further urging the friction member which is in contact with the braking member so as to generate the braking force, the subactuating unit being constituted by a piezoceramic element; and a controller for operating the main actuating unit first and then the subactuating unit in accordance with a brake command from a first sensor.

DESCRIPTION OF THE PREFERRED EMBODIMENTS

Figure 1:
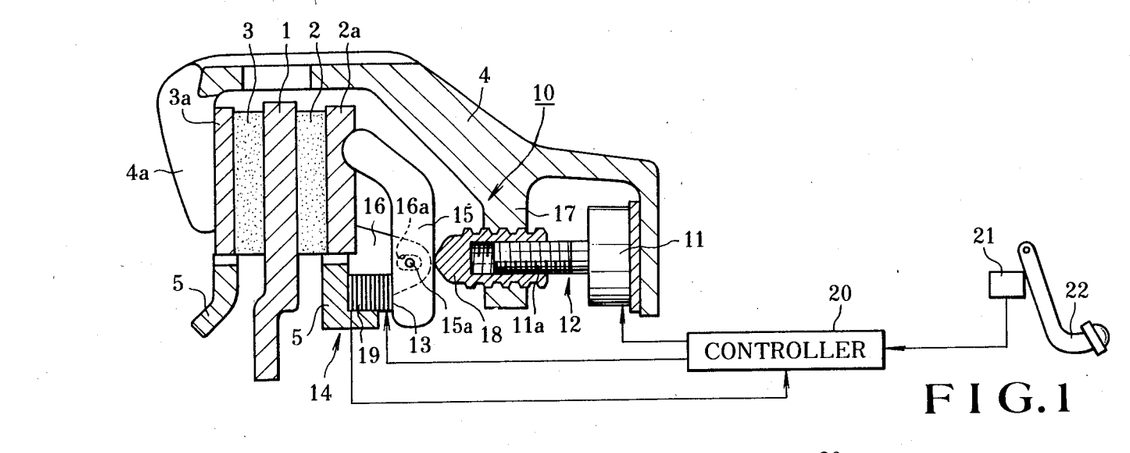
FIG. 1 is schematic view showing a brake apparatus according to an embodiment of the present invention.

FIG. 1 shows a brake apparatus according to an embodiment of the present invention which is applied to a single cylinder type disc brake. The overall construction of the disc brake will be described with reference to FIG. 1. A disc 1 serves as a member subjected to braking and is rotated together with a wheel (not shown). Friction pads 2 and 3 serve as friction members selectively brought into tight contact with two surfaces of the disc 1 to provide a braking force. Pad plates 2a and 3a are mounted on surfaces of the friction pads 2 and 3 which oppose their surfaces in contact with the disc 1. An actuator mechanism 10 is arranged outside the friction pad 2 to cause it to reciprocate along a direction perpendicular to the surface of the disc 1. The actuator mechanism 10 is held at one end of a frame, i.e., a caliper body 4. The other end of the caliper body 4 sits astride the disc 1 and faces the outer surface of the friction pad 3. Pawls 4a and 4b (only one pawl is illustrated) are integrally formed with the caliper body 4, so that the pad 3 can be moved by the actuator mechanism 10 so as to be brought into contact with or separated from the disc 1 along the direction perpendicular to the surface of the disc 1. The caliper body 4 is slidably supported by a substantially U-shaped support bracket 5 which sits astride the disc 1. The caliper body 4 is of a floating type. The construction of such a caliper body 4 is known to those skilled in the art, and a detailed description thereof will be omitted.

In the disc brake apparatus described above according to this embodiment, the main feature lies in the fact that the actuator mechanism 10 for producing a braking force in the disc brake comprises a main actuating unit 12 driven by a motor 11 and a subactuating unit 14 disposed parallel to the main actuating unit 12 and having a piezoceramic element 13.

More particularly, a press lever 15 serves as an inverted L-shaped press member which is pivotally supported on a support piece 16 mounted at the side of the support bracket 5 as the stationary portion. One end of the press lever 15 abuts against the pad plate 2a at the back of the friction pad 2. The press lever 15 thus urges the friction pad 2. The press lever 15 causes a screw member 18 to reciprocate the friction pad 2 with respect to the disc 1. In this case, the screw member 18 is threadably engaged at its rear side with a projection 17 extending at part of the caliper body 4. The screw member 18 is rotated through serrated engagement with an output shaft 11a upon rotation of the motor 11.

The piezoceramic element 13 is arranged between the other end of the press lever 15 and the support bracket 5 as the stationary portion. When the piezoceramic element 13 is elongated, it urges the lever 15 toward the disc 1. The piezoceramic element 13 serves as an actuator which is elongated/contracted when a voltage is applied thereto. The piezoceramic element 13 comprises a multilayer laminate made of a two-component (i.e., lead magnesium niobate and lead titanate) solid solution ceramic material. The piezoceramic element 13 has a length of 20 mm and an area of 300 mm$^2$. When a voltage of 200 V is applied to the piezoceramic element 13, it is confirmed that the piezoceramic element 13 generates a thrust of 500 kG and a displacement of about 0.01 mm. It should be noted that the thrust and the displacement of this piezoceramic element 13 are doubled when the positive and negative voltage components are alternately applied to the element. Such a piezoceramic element is described by Sadayuki Takahashi et. al., in "Small Size Piezoelectric Ceramic Actuator", Conference, the Institute of Electronics and Communication Engineers, May 17, 1983.

A force sensor 19 is arranged at the fixed end of the piezoceramic element 13 to detect a load when a force acts on the piezoceramic element 13 through the press lever 15, that is, when the lever 15 is pressed upon rotation of the motor 11 to close a distance between the disc 1 and the friction pad 2. The force sensor 19 supplies to a controller 20 a control signal for controlling switching between the drive systems of the motor 11 and the piezoceramic element 13.

In this embodiment, the force sensor 19 is arranged at the fixed end of the piezoceramic element 13 obtained by laminating a plurality of piezoelectric plates. The piezoceramic element 13 serves as an actuator for generating a force or a displacement when a voltage is applied thereto. At the same time, the piezoceramic element 13 serves as a sensor for generating a voltage when an external force acts thereon. When the force sensor 19 is formed integrally with the piezoceramic element 13, the number of components is decreased, and molding and assembly operations can be simplified.

However, the present invention is not limited to this arrangement. The force sensor 19 can be arranged separately from the piezoceramic element 13 at a position where a force acting on the lever 15 is detected. For example, the force sensor 19 may be arranged at the end of the element 13 which contacts the lever 15.

A pivot shaft 15a of the press lever 15 is fitted in an elongated hole 16a formed in the projection 16 so as to reciprocate the shaft 15a with respect to the friction pad 2 upon rotation of the motor 11. The friction pad 2 is moved by the lever 15 toward the disc 1 upon rotation of the motor 11. In addition, the displacement of the lever 15 will not cause the application of an unnecessary force on the piezoceramic element 13.

A pedal sensor 21 detects a pedaling force or a pedaling stroke when the driver depresses a brake pedal 22. An output signal from the pedal sensor 21 is supplied to the controller 20 which controls rotation of the motor 11.

Figure 2:
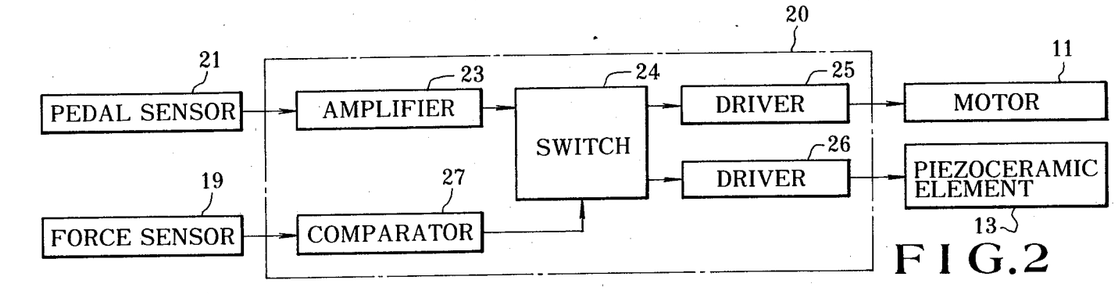
FIG. 2 is a block diagram of a controller shown in FIG. 1.

The function blocks of the controller 20 are illustrated in FIG. 2. The arrangement and operation of the controller 20 will be briefly described. The controller 20 receives output signals from the pedal sensor 21 and the force sensor 19. Among these signals, the signal from the pedal sensor 21 is amplified by an amplifier 23, and an amplified signal is supplied to a switch 24 for switching between the main actuating unit 12 and the subactuating unit 14. The signal from the switch 24 is supplied to the motor 11 or the piezoceramic element 13 through a driver 25 or 26. Meanwhile, the signal from the force sensor 19 is supplied to the switch 24 through a comparator 27. When a load detected by the force sensor 19 exceeds a predetermined value, the switch 24 changes operation from the driver 25 connected to the motor 11 to the driver 26 connected to the piezoceramic element 13.

An operational comparator may be connected to the driver 26 for the piezoceramic element 13 to compare the output signals from the pedal sensor 21 and the force sensor 19, thereby operating the piezoceramic element 13 to properly generate the braking force.

According to the actuator mechanism 10 having the arrangement described above, the motor 11 connected to the main actuating unit 12 is rotated in accordance with the pedaling force or the pedaling stroke. The friction pad 2 is urged by the press lever 15 against the disc 1 to close a space between the disc 1 and the friction pad 2. When a load detected by the force sensor 19 exceeds a predetermined value, the motor 11 is stopped. A voltage is then applied to the piezoceramic element 13 to obtain a braking force corresponding to the value represented by the detection signal from the pedal sensor 21. The pad 2 is then brought into contact with the disc 1 through the lever 15. The force sensor 19 determines the stopping of the motor 11. Therefore, even if the pad is worn, fine adjustment can be automatically performed.

An optimal space is obtained between the disc 1 and the pad 2 after the driver releases the pedal 22. This can be easily achieved by a predetermined number of reverse revolutions of the motor 11 when the load detected by the force sensor 19 reaches the predetermined value.

With the actuator mechanism 10 using the motor 11 and the piezoceramic element 13 so as to obtain the optimal braking force, a compact and lightweight disc brake can be obtained with a simple and low-cost construction. At the same time, this optimal braking force can be obtained as soon as the driver depresses the brake pedal. Various types of brake control operations such as anti-skid and pump braking can be easily performed by controlling the control signal from the controller 20. The piezoceramic element has low power consumption and generates low heat and low noise. The actuator mechanism 10 is adapted so as to decrease the installation space required and the manufacturing cost as compared with those of the conventional hydraulic brake system.

The present invention is not limited to this embodiment. The shape and construction of the respective components can be changed and modified within the spirit and scope of the invention.

For example, the actuator mechanism 10 having the electrical system according to the present invention can be used together with the conventional hydraulic cylinder type brake system so as to improve safety. At the same time, a large braking force is obtained when the actuator mechanism 10 is operated together with the hydraulic cylinder type brake.

In the above embodiment, the brake apparatus according to the present invention is applied to the single cylinder type disc brake. However, the present invention is not limited to this arrangement, but can be extended to various types of brake apparatuses including an opposed cylinder type disc brake system having the actuator mechanisms 10 at two sides of the disc 1.

As is apparent from the above description, according to the present invention, the main actuating unit having the motor for reciprocating the friction member through the press member with respect to the braking member is combined with the subactuating unit which is arranged to be parallel to the main actuating unit and which has the piezoceramic element for urging the press member against the friction member so as to obtain an optimal braking force. The optimal braking force can be obtained with a simple construction as soon as the driver depresses the brake pedal. In addition, different types of brake control operations such as anti-skid can be properly performed. As a result, the brake apparatus as a whole is simplified to provide a compact and lightweight construction at low cost.

Figure 3:
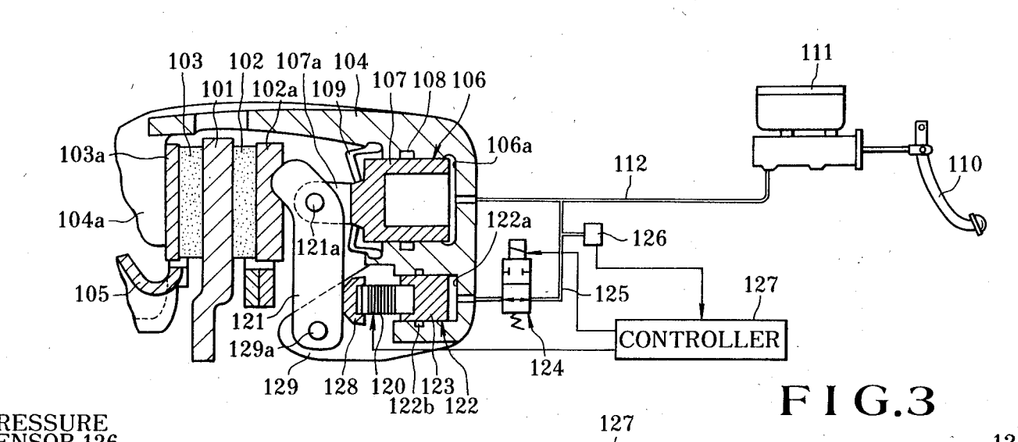
FIG. 3 is a schematic view showing a brake apparatus according to another embodiment of the present invention.

FIG. 3 shows a single cylinder disc brake which adapts a brake apparatus according to another embodiment of the present invention. The overall construction of the single cylinder type disc brake will be briefly described with reference to FIG. 3. A disc 101 as a braking member is rotated together with a wheel (not shown). Friction pads 102 and 103 are selectively brought into tight contact with two surfaces of the disc 101 to provide a braking force. Pad plates 102a and 103a are mounted on the outer surfaces of the friction pads 102 and 103, respectively. A caliper body 104 is arranged to sit astride the friction pads 102 and 103. The caliper body 104 is slidably supported by a substantially U-shaped support bracket 105 as a stationary portion which sits astride the disc 1. The caliper body 104 is of a floating type.

A cylinder hole 106a constituting a wheel cylinder 106 is formed at a portion opposing the rear surface of the friction pad 102 at one side of the caliper body 104. A piston 107 is fitted in the cylinder hole 106a, and a distal end of a rod 107a of the piston 107 abuts against the pad plate 102a to urge the pad 102 against the disc 101. Pawls 104a and 104b (the pawl 104b is not shown) are integrally formed with the other side of the caliper body 104 to face the rear surface of the friction pad 103.

The friction pad 103 is brought into tight contact with the disc 101 by the caliper body 104 operated by the wheel cylinder 106. Reference numeral 108 denotes a seal ring for sealing a gap between the piston 107 and the cylinder hole 106a and causing the piston 107 to return to the initial position; and 109, a boot.

A pipe 112 is coupled to a rear chamber of the piston 107 to supply pressurized brake fluid from a master cylinder 111 for generating a desired pressure upon depression of a brake pedal 110.

According to the disc brake having the construction described above, a braking piezoceramic element 120 is arranged at one side of the caliper body 104 to be parallel to the wheel cylinder 106. A thrust from the piezoceramic element 120 is transmitted to the friction pad 102 through a press lever 121 so as to obtain an amplified braking force.

More particularly, an auxiliary cylinder hole 122a is formed at one side of the caliper body 104 to be parallel to the cylinder hole 106a. A piston 123 is slidably supported in the auxiliary cylinder hole 122a and holds the rear end of the braking piezoceramic element 120. The fluid pressure bypassed from the pipe 112 is supplied to the bottom chamber of the auxiliary cylinder 122 through a bypass channel 125 having an electromagnetic valve 124. The electromagnetic valve 124 is controlled by a controller 127 operated in response to a signal from a pressure sensor 126 for detecting an upstream fluid pressure of the bypass channel 125 which is increased upon depression of the brake pedal. The bypass channel 125 is closed only when the fluid pressure exceeds a predetermined value. In this manner, the bypass channel 125 is normally opened.

A press element 128 is mounted at the distal end of the piezoceramic element 120. A bracket 129 has a pivot shaft 129a for pivoting the lever 121 urged by the press member 128 and is mounted in the caliper body 104. Reference numeral 122b denotes a seal ring. The distal end of the lever 121 is coupled to the piston rod 107a of the wheel cylinder 106 through a pivot shaft 121a.

Figure 4:
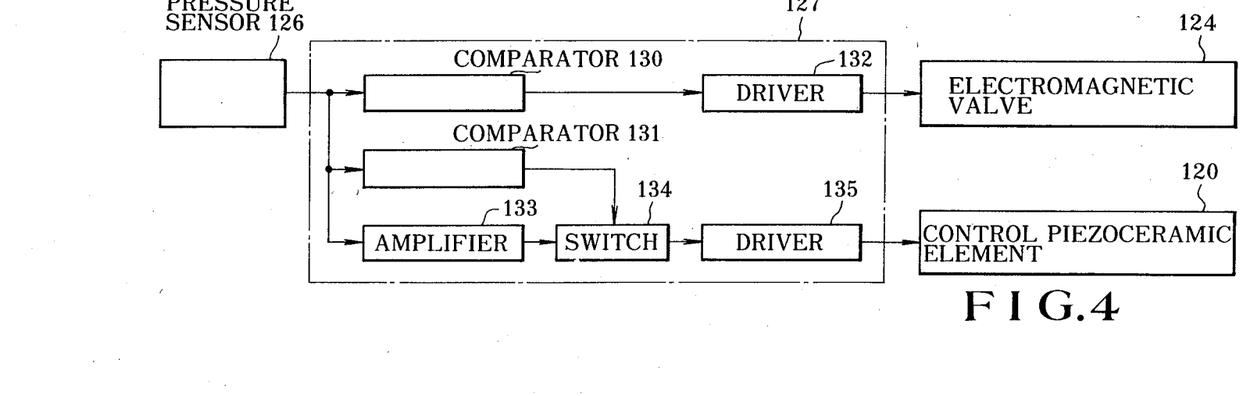
FIG. 4 is a block diagram of a controller shown in FIG. 3.

The piezoceramic element 120 is controlled by a controller 127 shown in FIG. 4 together with the electromagnetic valve 124.

The controller 127 has comparators 130 and 131 each of which compares input signals from the pressure sensor 126 with a reference signal. The comparator 130 is connected to a driver 132 for controlling the electromagnetic valve 124, and the comparator 131 is connected to a switch 134 to which an amplifier 133 is connected to amplify the input signal from the pressure sensor 126. The switch 134 is turned on/off by the comparator 131. When the switch 134 is turned on, a driver 135 is started to operate the piezoceramic element 120. The piezoceramic element 120 is substantially the same as the piezoceramic element 12 described with reference to FIG. 1.

According to the disc brake having the construction described above, the wheel cylinder 106 is started as soon as the driver depresses the brake pedal 110. The friction pad 102 is brought into tight contact with the disc 101 through the piston rod 107a and the lever 121. At the same time, when the fluid pressure detected by the pressure sensor 126 exceeds the predetermined value, the electromagnetic valve 124 is activated to close the bypass channel 125, and the piston 123 is locked. Simultaneously, a voltage is applied to the piezoceramic element 120 so as to obtain a braking force corresponding to a value represented by the detection signal from the pressure sensor 126. The pad 102 is thus urged by the resultant thrust against the disc 101 through the lever 121.

When the driver releases the brake pedal 110, an optimal gap must be obtained between the disc 101 and the pad 102. It can be readily understood that the cylinders 106 and 122 are rendered inoperative when a liquid pressure is lowered.

According to the construction wherein the piezoceramic element 120 is used together with the hydraulic wheel cylinder 106 to generate a braking force, the overall structure becomes simple, compact, lightweight and low cost. An optimal braking force can be generated as soon as the driver depresses the brake pedal. In addition, different types of brake control operations such as anti-skid and pump braking can be easily performed. The piezoceramic element 120 has low power consumption and generates low heat and low noise, resulting in convenience. The braking force can be doubled as compared with the conventional brake apparatus using only a hydraulic cylinder. Still the overall construction of the apparatus can be simplified.

The above embodiment is exemplified by the single cylinder type disc brake. However, it is easily understood that the present invention can be extended to various types of brake apparatuses such as an opposed cylinder type disc brake.

Figure 5:
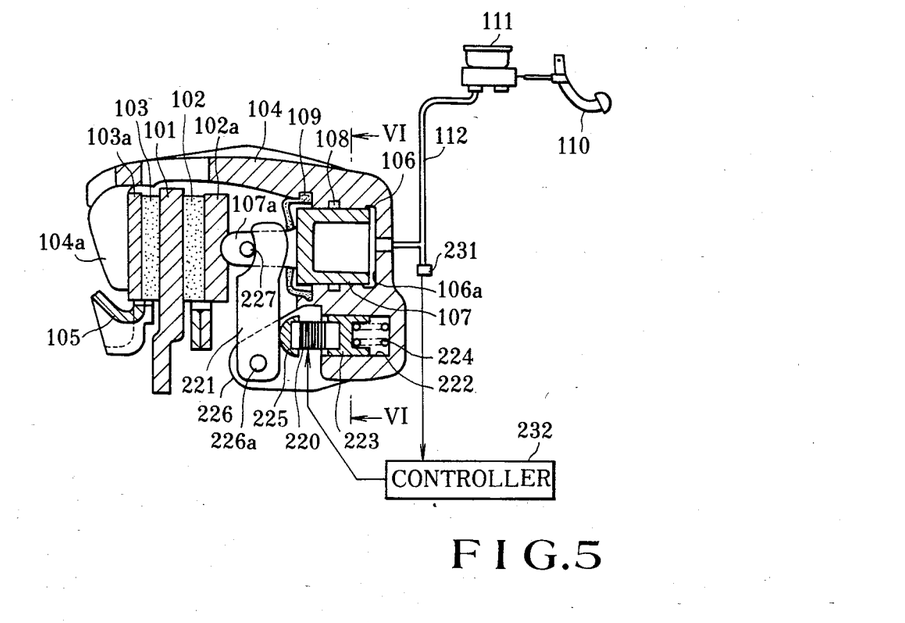
FIG. 5 is a schematic view showing a brake apparatus according to another embodiment of the present invention.
Figure 6:
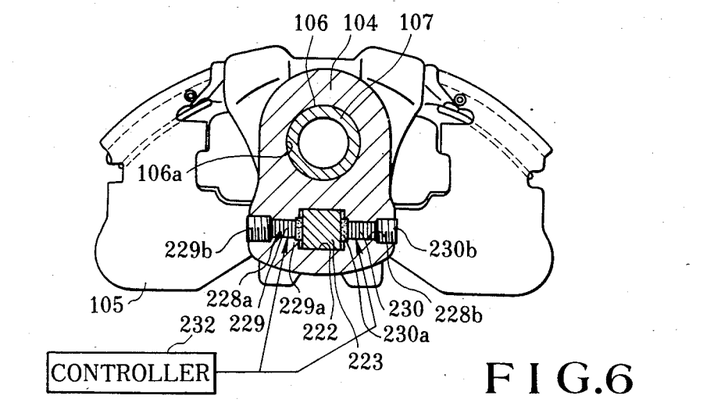
FIG. 6 is a sectional view of the brake apparatus taken along the line VI—VI of FIG. 5.
Figure 7:
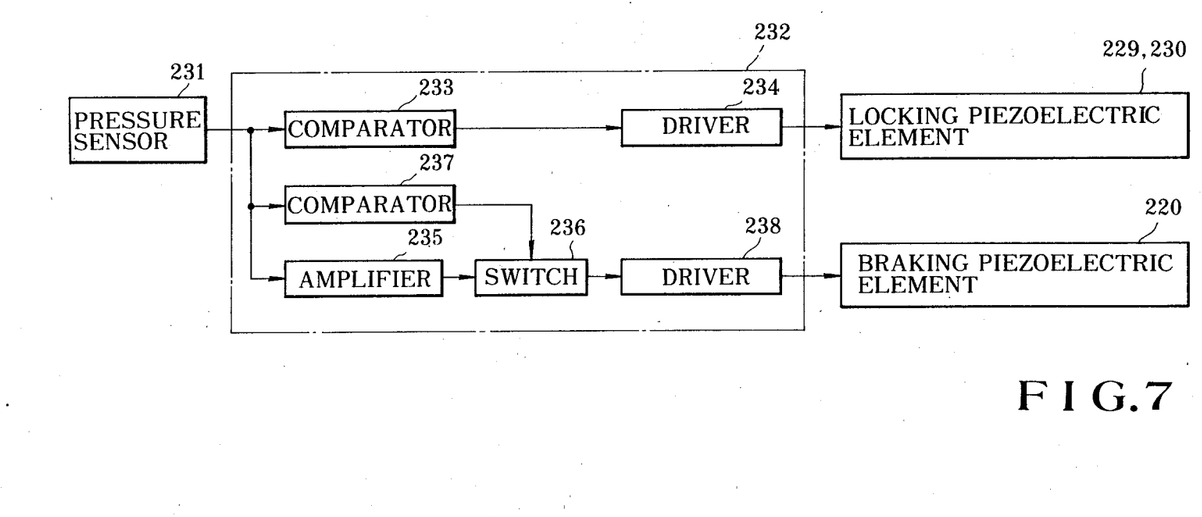
FIG. 7 is a block diagram of a controller shown in FIG. 5.

FIGS. 5-7 show still another embodiment of the present invention. The same reference numerals in FIGS. 5 and 6 denote the same parts as in FIG. 3. Referring to FIGS. 5 and 6, a disc 101 as a braking element rotated together with a wheel (not shown), friction pads 102 and 103 as friction members which selectively clamp the disc 101 to provide a braking force, pad plates 102a and 103a mounted on the outer surfaces of the pads 102 and 103, respectively, a caliper body 104 which sits astride the friction pads 102 and 103, and a U-shaped support bracket 105 as a stationary part are the same as those in FIG. 3, and a detailed description thereof will be omitted. In addition, a cylinder hole 106a constituting a wheel cylinder 106 housed in the caliper body 104, a piston 107 slidably received in the wheel cylinder 106, a rod 107a of the piston 107, a seal ring 108 and a boot 109 are the same as those in FIG. 3.

According to the brake apparatus having the construction described above, a braking piezoceramic element 220 is arranged at one side of the caliper body 104 parallel to the hydraulic wheel cylinder 106. A thrust from the piezoceramic element 220 is transmitted to the friction pad 102 through a press lever 221 to bring the friction pad 102 into tight contact with the disc 101.

More particularly, a holder hole 222 is formed at one side of the caliper body 104 to be parallel to the cylinder hole 106a. A holder 223 is slidably held in the holder hole 222 and holds the rear end of the piezoceramic element 220. The holder 223 is biased by a spring 224 mounted at the bottom portion of the holder hole 222 so as to urge the piezoceramic element 220 in a direction toward which the element 220 is removed from the holder hole 222. A press member 225 mounted at the distal end of the braking piezoceramic element 220 is engaged with the press lever 221 pivotally supported about a shaft 226a of a bracket 226 mounted in the caliper body 104, thereby urging the press member 225 toward the pad 102. The distal end of the lever 221 is engaged with an engaging pin 227 mounted on the piston rod 107a of the wheel cylinder 106, so that the pad 102 is urged against the disc 101 through the pad 102.

As shown in FIG. 6, holes 228a and 228b are formed in one side surface of the caliper body 104 to be perpendicular to the holder hole 222. A pair of locking piezoceramic elements 229 and 230 are fitted in the holes 228a and 228b to lock the holder 223 at a predetermined position. Pads 229a and 230a are mounted at the distal ends of the locking piezoceramic elements 229 and 230 and abut against the holder 223, thereby restraining the movement of the holder 223. Blind stops 229b and 230b close the open ends of the holes 228a and 228b, respectively.

The braking piezoceramic element 220 and the locking piezoceramic elements 229 and 230 are controlled by a controller 232 operated in response to a signal from a pressure sensor 231 which is arranged midway in a pipe 112 coupled to the hydraulic wheel cylinder 106 and which detects a fluid pressure upon depression of the brake pedal.

The controller 232 will be briefly described with reference to FIG. 7. An output signal from the pressure sensor 231 is supplied to a comparator 233 in the controller 232. The comparator 233 determines whether or not a pressure detected by the pressure sensor 231 exceeds a predetermined value (i.e., a value obtained when the pad 102 is brought into contact with the disc 101) at the wheel cylinder 106. When the detected pressure exceeds the predetermined value, the comparator 233 supplies a signal to a driver 234. The driver 234 then operates the locking piezoceramic elements 229 and 230 which restrain the movement of the holder 223.

Furthermore, the output signal from the pressure sensor 231 is supplied to a switch 236 through an amplifier 235. When the switch 236 is turned on in response to a signal from the comparator 237 for discriminating the signal from the pressure sensor 231 in the same manner as described above, a driver 238 drives the braking piezoceramic element 220. The pad 102 is brought into tight contact with the disc 101 through the lever 221 at a desired urging force, thereby obtaining an optimal braking force.

The respective piezoceramic elements 220, 229 and 230 serve as actuators which are elongated/contracted when a voltage is applied thereto in the same manner as those described in the previous embodiments, and a detailed description thereof will be omitted.

According to the brake apparatus having the construction described above, the wheel cylinder 106 is operated when the driver depresses the brake pedal 110, and the pad 102 is brought into tight contact with the disc 101. When a fluid pressure detected by the pressure sensor 231 exceeds the predetermined value, a force generated by the braking piezoceramic element 220 is applied through the lever 221 since the holder 223 is locked. Therefore, the desired and optimal braking force can be easily generated.

When the driver releases the brake pedal 110, the wheel cylinder 106 is released and the braking piezoceramic element 220 is deenergized. In addition, the holder 223 for holding the piezoceramic element 220 is released.

According to the brake apparatus using the braking piezoceramic element 220 and the locking piezoceramic elements 229 and 230 in addition to the hydraulic wheel cylinder 106, as described above, an optimal braking force can be obtained as soon as the driver depresses the brake pedal 110, and the braking apparatus can be rendered simple and low cost. In addition, by controlling the brake signal from the controller 232, different types of brake control operations such as anti-skid and pump braking can be easily performed. Although the piezoceramic elements 220, 229 and 230 are operated as actuators, they have low power consumption, low heat and low noise. By adding the subactuating unit, the braking force can be doubled as compared with the conventional hydraulic brake. At the same time, the overall brake apparatus has a simple, compact and lightweight construction.

What is claimed is:

1. A brake apparatus comprising an actuator mechanism for bringing a friction member into tight contact with a braking member to generate a braking force, said actuator mechanism comprising:
   a main actuating unit for moving said friction member to a position where said friction member is in contact with said braking member;
   a subactuating unit for further urging said friction member which is in contact with said braking member so as to generate the braking force, said subactuating unit being constituted by a piezoceramic element; and
   a controller for operating said main actuating unit first and then said subactuating unit in accordance with a brake command from a first sensor.

2. An apparatus according to claim 1, wherein said main actuating unit includes a motor.

3. An apparatus according to claim 2, wherein said motor in said main actuating unit is fixed on a frame and is rotated to bring said friction member near said braking member through a mechanism for converting a rotational force to a linear force.

4. An apparatus according to claim 1, further comprising a press member disposed between said main actuator unit and said friction member, said press member being pivoted about a shaft and being engaged with said main actuating unit such that one end of said press member urges said friction member toward said braking member.

5. An apparatus according to claim 4, wherein said subactuating unit is disposed between the other end of said press member and a stationary member.

6. An apparatus according to claim 1, wherein said controller controls said main actuating unit and said subactuating unit such that said main actuating unit is stopped and said subactuating unit is started in response to an output from a second sensor for detecting that said friction member is in tight contact with said braking member at a pressure exceeding a predetermined pressure.

7. An apparatus according to claim 6, wherein said second sensor comprises a piezoceramic element.

8. An apparatus according to claim 7, wherein said piezoceramic elements of said second sensor and said subactuating unit are formed integrally with each other.

9. An apparatus according to claim 8, wherein said controller comprises:
   an amplifier, connected to said first sensor, for receiving the brake command from said first sensor and generating an amplified output, said first sensor being a brake pedal sensor;
   a comparator, connected to said second sensor, for receiving a signal representing the pressure of said braking member and supplied from said second sensor and for generating an output when the pressure exceeds the predetermined pressure;
   a switch, connected to said amplifier and said comparator, for receiving the amplified signal from said amplifier and the output from said comparator and for generating a control signal; and
   first and second drivers, commonly connected to said switch and selectively driven in response to the control signal therefrom, for respectively driving said motor and said piezoceramic element, said first and second drivers being switched from said first driver to said second driver when the pressure exceeds the predetermined pressure.

10. An apparatus according to claim 1, wherein said main actuating unit comprises a hydraulic cylinder for applying a force on said friction member in accordance with a pressure generated when a brake pedal is depressed.

11. An apparatus according to claim 10, wherein said controller comprises:
    first and second comparators, commonly connected to said first sensor, for comparing the output representing the pressure and generated from said first sensor with a threshold value and for generating an output when the pressure exceeds a predetermined pressure, said first sensor being a pressure sensor of said hydraulic cylinder;
    an amplifier, connected to said pressure sensor, for amplifying the output from said first sensor;
    a switch, connected to said second comparator and said amplifier, for generating a control signal; and
    first and second drivers, connected to said first comparator and said switch, for driving said electromagnetic valve and said subactuating unit.

12. An apparatus according to claim 1, wherein a lever is arranged between said main actuating unit and said friction member, one end of said lever being engaged with said friction member and the other end thereof being pivotally supported, and said subactuating unit is engaged with said lever to apply the force in the same direction as that of said main actuating unit.

13. An apparatus according to claim 1, wherein said main actuating unit includes a hydraulic cylinder which is operated by a fluid pressure generated upon depression of a rake pedal and which urges said friction member, and said subactuating unit has said piezoceramic element arranged in parallel with said hydraulic cylinder so as to apply a force to said friction member, said piezoceramic element being held at a rear end thereof by a piston of an auxiliary cylinder connected to a fluid supply pipe through an electromagnetic valve energized/deenergized in accordance with a pressure in said fluid supply pipe.

14. An apparatus according to claim 13, wherein said controller comprises:
    first and second comparators, commonly connected to said first sensor, for comparing the output representing the pressure and generated from said first sensor with a threshold value and for generating an output when the pressure exceeds a predetermined pressure, said first sensor being a pressure sensor of said hydraulic cylinder;
    an amplifier, connected to said pressure sensor, for amplifying the output from said first sensor;
    a switch, connected to said second comparator and said amplifier, for generating a control signal; and
    first and second drivers, connected to said first comparator and said switch, for driving said valve and said piezoceramic element, respectively.

15. An apparatus according to claim 14, wherein locking piezoceramic elements are arranged such that said locking piezoceramic elements are engaged with said piston to stop said piston at a predetermined position.

16. A braking apparatus comprising an actuator mechanism for bringing a friction member into tight contact with a braking member to generate a braking force, said actuator mechanism having a hydraulic cylinder which is operated by a fluid pressure generated upon depression of a brake pedal and which applies a force to said friction member, and a braking piezoceramic element which is arranged in parallel with said hydraulic cylinder and which applies a force to said friction member, said braking piezoceramic element having a rear end held by a holder biased in a direction where said friction member is urged toward said braking member, said holder being provided with locking piezoceramic elements for stopping said holder at a predetermined position.

17. An apparatus according to claim 16, wherein a controller is provided which comprises:

first and second comparators, commonly connected to a first sensor, for comparing the output representing the pressure and generated from said first sensor with a threshold value and for generating an output when the pressure exceeds a predetermined pressure, said first sensor being a pressure sensor of said hydraulic cylinder;

an amplifier, connected to said pressure sensor, for amplifying the output from said first sensor;

a switch, connected to said second comparator and said amplifier, for generating a control signal; and first and second drivers, connected to said first comparator and said switch, for driving said locking and braking piezoceramic elements, respectively.

* * * * *